US012719683B2

(12) United States Patent
Emeis et al.

(10) Patent No.: US 12,719,683 B2
(45) Date of Patent: Aug. 25, 2026

(54) USAGE BASED TOKEN EXPIRATION

(71) Applicant: Cisco Technology, Inc., San Jose, CA (US)

(72) Inventors: Mark William Emeis, Monument, CO (US); Terence James Boldt, Oakville (CA); Donald Mark Allen, Colorado Springs, CO (US); Jeffrey C. Clark, Cary, NC (US); Mark Edward Eastman, Holly Springs, NC (US); John William Hayduk, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 22 days.

(21) Appl. No.: 18/799,485

(22) Filed: Aug. 9, 2024

(65) Prior Publication Data

US 2026/0046129 A1 Feb. 12, 2026

(51) Int. Cl.
*H04L 9/32* (2006.01)
*H04L 9/08* (2006.01)

(52) U.S. Cl.
CPC .......... *H04L 9/3213* (2013.01); *H04L 9/0891* (2013.01); *H04L 9/3228* (2013.01)

(58) Field of Classification Search
CPC .... H04L 9/3213; H04L 9/0891; H04L 9/3228
See application file for complete search history.

(56) References Cited

U.S. PATENT DOCUMENTS 11,228,437 B1 * 1/2022 Wooster ................ H04L 9/3213
11,252,190 B1 * 2/2022 Sharifi Mehr .......... H04L 63/10
11,824,856 B1 * 11/2023 Sharma ................. H04L 9/3213
11,902,289 B2 * 2/2024 Dunjic .................. H04L 9/3213
12,256,007 B2 * 3/2025 Krishnan ............. H04L 9/3213
2018/0367528 A1 * 12/2018 Schwarz ............... H04L 9/3213
2019/0319843 A1 * 10/2019 Telfer .................... H04L 9/3213
2020/0258050 A1 * 8/2020 Wang .................... H04L 9/3213
2020/0336494 A1 * 10/2020 Kitagata ............. H04L 63/0807
2021/0056196 A1 * 2/2021 Jain ......................... G06F 21/45
2021/0288808 A1 * 9/2021 Bahety ................. H04L 9/3213
2022/0131851 A1 * 4/2022 Singh ...................... H04L 67/02
2023/0362008 A1 * 11/2023 Chang .................. H04L 9/3213
(Continued)

OTHER PUBLICATIONS

Autho By Okta, "Refresh Token Rotation," Retrieved from https://auth0.com/docs/secure/tokens/refresh-tokens/refresh-token-rotation, on May 15, 2024, 24 Pages.
(Continued)

*Primary Examiner* — Richard G Keehn
(74) *Attorney, Agent, or Firm* — Edell, Shapiro & Finnan, LLC

(57) ABSTRACT

Methods for allowing a user or a client web service to control or adjust use limit of an access token instead of relying on provider based time limits are provided. Specifically, methods involve obtaining an access request for a web-based service. The access request includes at least one usage condition for accessing the web-based service. The methods further involve generating an access token having a time-to-live value in response to the access request. The access token further includes the at least one usage condition that specifies a use limit for the access token. The methods further involve providing the access token for accessing the web-based service.

20 Claims, 8 Drawing Sheets

(56) References Cited

U.S. PATENT DOCUMENTS

| | | | | |
|---|---|---|---|---|
| 2024/0305463 | A1* | 9/2024 | Rojas | H04L 9/3213 |
| 2024/0396732 | A1* | 11/2024 | Bok | H04L 9/3297 |
| 2025/0247234 | A1* | 7/2025 | Garrepalli | H04L 9/3213 |

OTHER PUBLICATIONS

Curity, "Scope Best Practices," Retrieved from https://curity.io/resources/learn/scope-best-practices/, last updated Feb. 21, 2023, 11 Pages.

Curity, "Scopes and Claims," Retrieved from https://curity.io/docs/idsvr/latest/token-service-admin-guide/scopes.html, on May 15, 2024, 11 Pages.

OpenID, "What is OpenID Connect," Retrieved from https://openid.net/developers/how-connect-works/, on May 15, 2024, 5 Pages.

SOLO.IO: "[Tutorial] Securing Rate Limit Actions with JSON Web Tokens (JWT)", Aug. 10, 2020, Retrieved from https://www.solo.io/blog/tutorial-securing-rate-limit-actions-with-json-web-tokens-jwt/, 5 Pages.

Thomas K., "Adding an Extra Level of Authentication with Step Up MFA", Dev, Posted on Apr. 5, 2021, Retrieved from https://dev.to/kleeut/adding-an-extra-level-of-authentication-with-step-up-mfa-95j, 13 Pages.

Tubul S., "Dynamic Routing Based on JWT Token's Claim with Kong Konnect", Engineering, Kong Inc, Nov. 3, 2022, Retrieved from https://konghq.com/blog/engineering/dynamic-routing-jwt-tokens-claim-with-kong-konnect, 13 Pages.

TYK API Management Community, "Rate Limiting Policy Is Not Being Applied Dynamically Using JWT Scope Claims Mapping," Retrieved from https://community.tyk.io/t/rate-limiting-policy-is-not-being-applied-dynamically-using-jwt-scope-claims-mapping/5375, last updated Apr. 2022, 3 Pages.

* cited by examiner

700

USAGE BASED TOKEN EXPIRATION

TECHNICAL FIELD

The present disclosure generally relates to computer networks and systems.

BACKGROUND

The distributed nature of web-based applications and the growing threat of bad actors in the ecosystem necessitate continuous evolution of mechanisms to authenticate and authorize users when they operate in this distributed environment. There are various technologies to authenticate users and their actions. For example, an Open Authorization (OAuth2) authorization model or a Spring Security authentication model may authenticate a client to a web-based application and issue access tokens for use of the web-based application. One example of an access token is a JavaScript Object Notation (JSON) web token. JSON web tokens may be used by an authenticated client (trusted client) to securely access web-based services.

DETAILED DESCRIPTION OF EXAMPLE EMBODIMENTS

Overview

Figure 1:
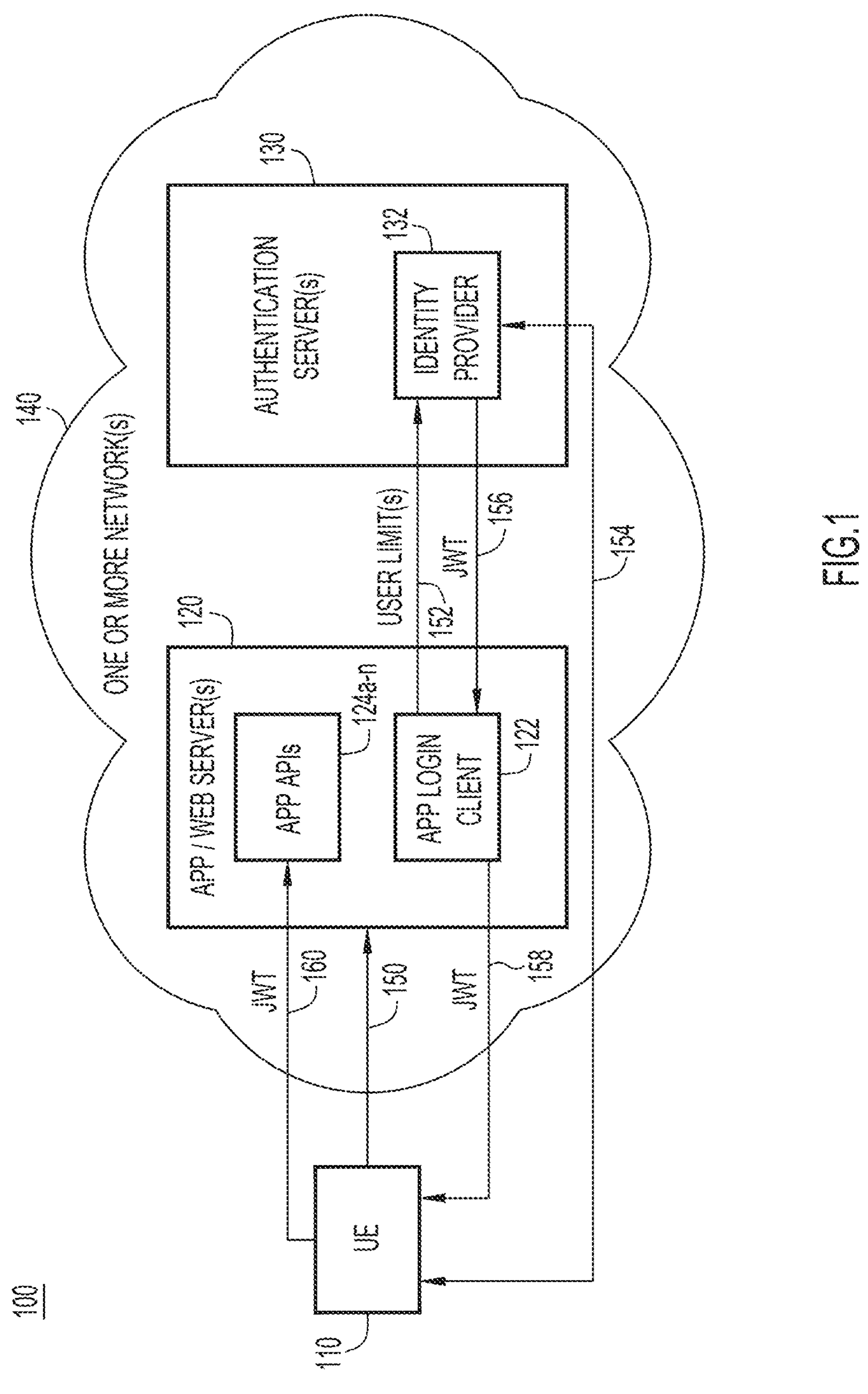
FIG. 1 is a diagram illustrating a system in which access tokens are generated with use limit(s) provided in an access request, according to an example embodiment.

Techniques presented herein allow a user or a client web service to control or adjust a use limit of an access token within provider-based time limits.

In one form, methods involve obtaining an access request for a web-based service. The access request includes at least one usage condition for accessing the web-based service. The methods further involve generating an access token having a time-to-live value in response to the access request. The access token further includes the at least one usage condition that specifies a use limit for the access token. The methods further involve providing the access token for accessing the web-based service.

Example Embodiments

A JSON web token (JWT) is an open standard that provides a compact and self-contained method for securely transmitting data between systems using digital signing e.g., a client and a web-based service i.e., providing immutable proof of the user. The JWT typically provides default settings for a time-to-live (TTL) value and application programming interface (API) call management. Many interactions may be satisfied with this approach. However, there are contexts where this approach is onerous for a user (e.g., default rate limits) or when the settings provide excessive functionality which might expose the use of the token for nefarious intentions (financial and personal identifiable information (PII) data exposure). That is, computing devices are functioning increasingly faster and without a hard limit on a number of application programming interface (API) calls or on a number of uses, a computing device may perform more calls within the time-to-live value than ever before. Further, clock skews between entities may complicate use of access tokens with time-to-live values.

The techniques presented herein utilize JWT capabilities for support of "special" user requests using a claims capability. That is, the techniques presented herein allow clients to control use limits of access tokens instead of solely relying on provider-based rate limits.

Typically, when making authenticated calls with a JWT token to APIs, there is a rate limit based on a client identifier registered with the JWT. This rate limit is a provider configuration and is time-based, such as calls per day, calls per hour, calls per second, and often is a combination of these time rate limits. This does not allow the client to make their own choice about rate limits, limiting per token authentication, nor does it permit the client to specific what level of authentication is required to allow more or fewer calls. For example, a client may wish to authenticate in a less onerous manner while limiting the JWT to only certain operations such as read-only operation and for fewer calls. Likewise, clients may be willing to accept more scrutiny with levels of multi-factor authentication (MFA) to receive an access token where they request far greater number of calls than usual. There are no techniques heretofore known that allow clients to control rate limits and/or adjust rate limits within the confines of a provider-based rate limits.

Techniques presented herein provide for clients to adjust their use limits of access tokens within provider-based rate limits. In one or more example embodiments, an access request for a web-based service includes at least one usage condition e.g., a use limit that is a count value indicative of the number of times the access token is to be used to access the web-based service. As such, when an access token is generated, in addition to having a provider-based time-to-live (TTL) value, the access token further includes one or more usage conditions that specify a use limit for the access token. In other words, access tokens include use based expirations.

While one or more example embodiments describe JWTs, the techniques presented herein are not limited thereto. The techniques presented herein may be applicable to other security or access protocols that issue access tokens herein known or later developed.

FIG. 1 is a block diagram illustrating a system 100 in which access tokens are generated with use limit(s) provided in an access request, according to an example embodiment. The system 100 includes a user device or user equipment (UE 110), application or web servers (app/web server(s) 120), an authentication server(s) 130. Entities of the system 100 are connected to one another, via one or more network(s) 140.

In various example embodiments, the entities of the system 100 (the UE 110, the app/web server(s) 120, the authentication server(s) 130) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) such as the one or more network(s) 140. Each entity may include internal and external hardware components such as those depicted and described in further detail in FIG. 8. In one example, at least some of these entities may be embodied as virtual devices with functionality distributed over a number of hardware devices such as virtual switches, routers, in a cloud, etc.

The one or more network(s) 140 include a plurality of network devices, which are transport nodes (e.g., switches, routers, leaf nodes, spine nodes, etc.) configured to transmit network communications between entities of the system 100. The one or more network(s) 140 may include internal communication networks and/or external communication networks such as the Internet.

The UE 110 is an endpoint device such as a desktop computer, a laptop computer, tablet computer, a smartphone, or the like. The UE 110 may be a computing device such as a computing device of FIG. 8. The UE 110 is configured to execute an application or client application that provides a user interface (UI) e.g., a web browser to access one or more web-based services.

The web-based services may be running on the app/web server(s) 120 and may involve application login client 122 to authenticate a user and various App APIs 124*a-n* for accessing various functionalities of the web-based services.

The notations 1, 2, 3, . . . n; a, b, c,. n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario. In other words, this is only an example of the system 100, and the number and types of entities may vary based on a particular deployment and use case scenario. For example, while only one UE 110 and web-based service are depicted, the number of UEs and/or web-based services may vary based on a particular deployment and use case scenario.

A web-based service may be a web application running in a datacenter or cloud computing environment. The web-based services may be various types of web applications such as financial applications, gaming applications, shopping applications, networking applications, etc.

The application login client 122 may be a piece of software that requests access tokens either for authenticating a user or for accessing a resource of the web-based service. A resource of the web-based service may be referred to as a functionality of the web-based service that is accessible via App APIs 124*a-n*. The application login client 122 is registered with the authentication server(s) 130. The application login client 122 is configured to outsource authentication onto the web-based service to the authentication server(s) 130.

In one or more example embodiments, to access a web-based service, a user interacts with the UE 110 to authenticate onto the web-based service e.g., via the application login client 122. Based on the authentication, the user gains access to the web-based service and one or more of the App APIs 124*a-n* e.g., withdraw money, view account balance, etc. for a financial application or change configuration setting, play a game, make an in-app purchase, etc. for a gaming application.

The authentication server(s) 130 serves as an identity provider 132 and is configured to authenticate a user onto the web-based service. For example, the user may input their login credentials using the UE 110 and the authentication server(s) 130 authenticates the user based on an input username and password and a username and password stored at the authentication server(s) 130 (user identifier, password, location, etc.). In one example embodiment, the authentication server(s) 130 may perform additional authentication e.g., an additional multi-factor authentication (MFA) and communicate directly with the UE 110 (at 154, explained below). In short, the authentication server(s) 130 authenticate a user for accessing the web-based service based on the access request and generate an access token based on a successful authentication of the user. The authentication server(s) may implement OAuth 2.0 protocol and is considered security token service that validates claims made and issues immutable tokens for communicating among entities (client and server).

An access token generally refers to a token granted by the identity provider 132 e.g., a JSON web token. The token is an outcome of an authentication process. The token includes a set of scopes and claims that establish security boundaries and restrict access to web-based service i.e., resources or functions of the service. Scopes are a claim that represent permissions granted to an authenticated entity. Claims are content that are asserted about the authenticated entity that has been validated or verified by the identity provider 132. As an example, a claim may include statements such as "This is John", where a scope would define specific actions that are permitted e.g., John has administrative access. That is, the scope may state what John's role is and that implies actions that John is permitted to perform.

In one or more example embodiments, in addition to a time limit set by the identity provider 132 (provider-based limit), the access token may further include at least one usage condition (use limit). For example, the access token may include at least two scopes of use. Each scope of use has a corresponding count value indicative of a number of times the access token is to be used for the respective scope of use of the web-based service.

As noted above, in the system 100, a web application or a website (a web-based service executing on the app/web server(s) 120) delegates authentication and authorization to the identity provider 132. The web application is to trust the response from the identity provider 132 and the identity provider 132 is to ensure its response is not tampered with. This may be achieved using JWTs i.e., permitting access to the web application when the JWT is valid.

Specifically, at 150, the user may request access to a web-based service by sending an access request to the application login client 122. The access request may include usage condition(s). Usage condition(s) may be preconfigured user settings for using the web-based service. For example, usage condition(s) may specify a count value that indicates a number of times the access token is to be used before reauthentication is required. This count value may be decremented after each use of the JWT. When there are no remaining uses (count value is 0), access to the web-based service is no longer permitted until perhaps, another successful reauthentication and a new JWT.

The web-based service may require information about the user, which is requested from the identity provider 132 using scopes and claims. That is, at 152, the application login client 122 may provide the access request (with input information such as username and password) to the identity provider 132 for authentication along with use limit(s). The use limit(s) are usage conditions of the user and/or web-service (client-based conditions). In one example embodiment, the application login client 122 may specify the usage conditions preset for the web-based service instead of or in addition to the user.

As an example, user may set a use limit to two uses e.g., two actions may be performed before the token expires and the web-based service may set the use limit to ten uses before the token expires. The identity provider 132 may store or access rules that govern use limit(s). In this instance, the rule may specify that the lowest use limit is it be used. As such, the token is generated with a count value set to two, which is then decremented with each use. That is, the use of the token is tracked by the app/web server(s) 120 such that the token is expired after two actions are performed regardless of the provider-based time expiration. For example, a web-based service is a banking application and the action is withdrawal from a user account. The access token may be valid for two withdrawal actions. After the two withdrawals are made, the token is no longer valid i.e., expires.

Before the identity provider 132 generates the access token (JWT), in some example embodiments, additional authentication may be performed. For example, at 154, the identity provider 132 may communicate with the UE 110 to authenticate the user e.g., one time code via text, email, etc. or some other form of a multi-factor authentication. That is, at 154, an external authentication is performed using some other entity i.e., outside of the web-based service. As another example, the user identity may be obtained from another web-based service. This additional authentication may be optional at least in some example embodiments.

Based on a successful authentication of the user, the identity provider 132 generates the access token (JWT), which includes the result of the scope and claim provided in the access requests. At 156, the JWT is provided to the application login client 122 and at 158, to the UE 110. Since the JWT is signed, both parties can rely on the information therein.

Additionally, the JWT may be safely passed to other parts of the service like the App APIs 124*a-n*. At 160, the UE 110 uses the JWT to gain access to various services provided by a web application e.g., to make withdrawals, view account balance, etc. The App APIs 124*a-n* may trust that the JWT has not been tampered with and obtain information about the user and other application claims. Both the UE 110 and the App APIs 124*a-n* validate the access token (JWT). The JWT is immutable. If JWT is tempered with, it will not be validated and access will be denied. That is, a respective one of the App APIs 124*a-n* will not provide data requested or will not perform the requested action (withdrawal denied, transaction history not shown, etc.).

In one or more example embodiments, the identity provider 132 may issue multiple JWTs. Usually, the identity provider 132 issues one access token for identity (after successful authentication), one access token for access, and one access token (new access token) for refreshing the original access token. Access tokens are used by the web-based application and expire after a certain amount of time and/or when use limit(s) are reached (remaining count value is zero). That is, use of the access token may be tracked and the count value may be decremented after each use. The App APIs 124*a-n* may be used with the access token (using web-based service is permitted) while the count value and the time-to-live value are valid. Access to the web-based service may then be denied (not permitted) in response to exceeding the use limit determined based on the count value. Further, a new access token may be issued in which the count value is set to a remaining use limit based on the tracking, example of which is detailed below.

Figure 2:
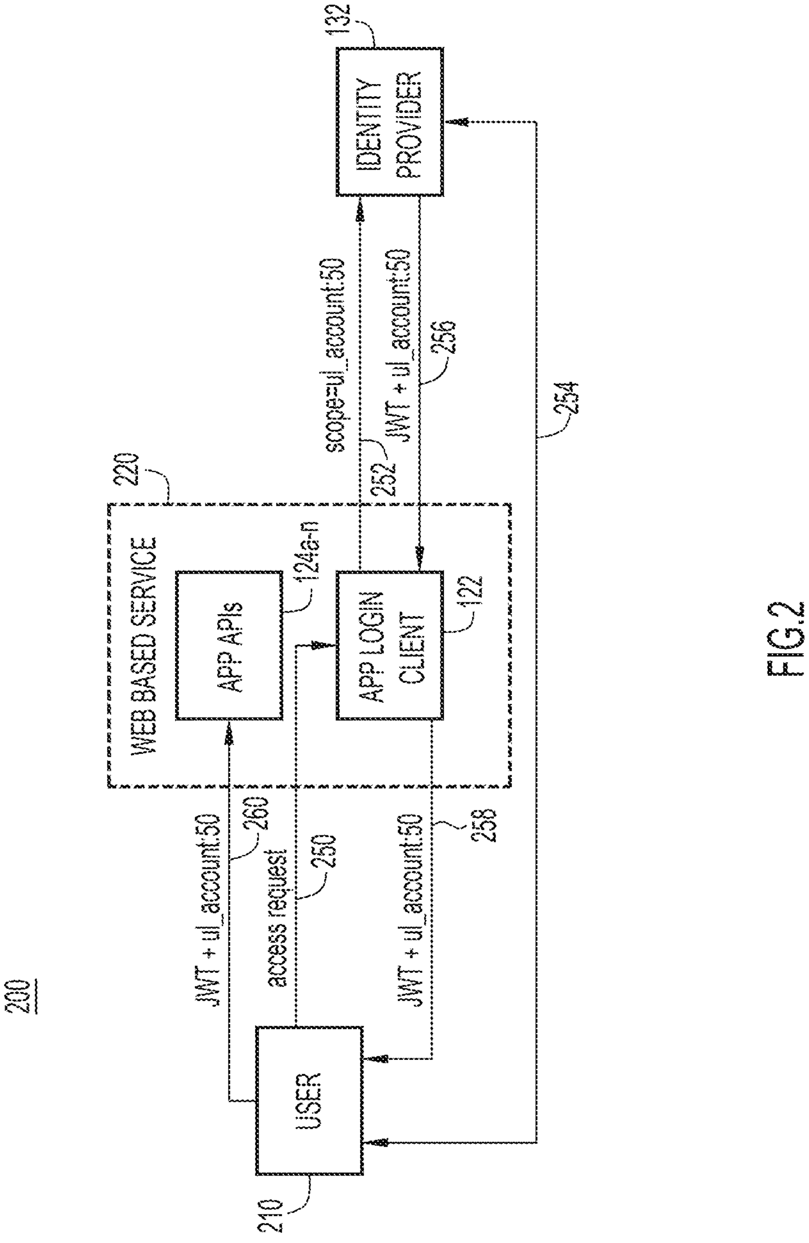
FIG. 2 is a diagram illustrating a process of generating and using an access token having a use limit based on a usage condition specified in an access request, according to an example embodiment.

With continued reference to FIG. 1, FIG. 2 is a diagram illustrating a process 200 of generating and using an access token having a use limit based on a usage condition specified in an access request, according to an example embodiment. The process 200 may be performed by the system 100 of FIG. 1 and involve entities such as a user 210, the application login client 122 of FIG. 1, the App APIs 124*a-n* of FIG. 1, which are components of a web-based service 220, and the identity provider 132 of FIG. 1.

The process 200 involves generating access tokens with scopes and claims that are use based in addition to time based. The immutable access tokens (JWTs) include use limits that are utilized by the web-based service or web application infrastructure to track use and reject requests from the user 210 when the use limits have been exceeded regardless of the expiration date/time of the access token.

Specifically, the process 200 involves at 250, the user 210 requesting access to the web-based service 220. That is, an access request is generated by the user 210 via the UE 110 of FIG. 1, and is provided to the application login client 122. By way of an example, the access request may include a username and password being input in an application login page provided by the application login client 122 on a web browser of a user device.

The application login client 122 may then generate an access request with scopes and claims that are usage based in addition to time based. In an example embodiment of FIG. 2, the usage conditions may be hard coded into the web-based service 220 (as opposed to being provided by the user 210). In yet another example embodiment, the usage conditions may be pre-configured by the user 210 and stored with the web-based service 220 e.g., by using user settings stored on the UE 110 of FIG. 1. Usage conditions may involve one or more count values for various geographic conditions, unknown devices (another UE other than the UE 110 of FIG. 1), etc. In yet another example embodiment, usage conditions may be dynamically set by an external entity, exampled described in FIG. 3.

In any case, at 252, an access request is provided to the identity provider 132. The access request includes a scope that specifies a use limit ("ul"). For example, the scope involves a use limit for a user account, which is set to a count value "50" ("scope=ul_account: 50"). That is, the access token (JWT) is to expire after 50 uses regardless of the time-to-live value. The scope defines use for the token such as accessing a banking account of the user 210 for any type of actions (e.g., withdrawals, deposits, reading operations such as review transaction history, etc.).

At 254, the identity provider 132 authenticates the user 210 e.g., by performing additional multi-factor authentication directly with the user 210.

Based on a successful authentication of the user 210, the identity provider 132 generates the access token (JWT). At 256, the identity provider 132 then returns to the application login client 122, the requested scopes and claims within either the identity or the generated access tokens (JWT+ ul_account: 50). Without modifying the identity provider 132, the web-based service 220 makes a request for a specific use limit scope and the identity provider 132 includes that scope request within the access token (JWT). This ensures that the immutable token has a use limit and that the immutable token can be trusted. By way of an example in the process 200, a scope request of use limit "50 uses", translates into a use limit for the account of 50 calls i.e., the count value is set to "50". At 258, the JWT that includes the scope with a use limit (ul_account: 50 calls) is provided to the user 210, which at 260, uses the JWT with the use limit of 50 calls to contact the App APIs 124*a-n* of the web-based service 220.

Figure 3:
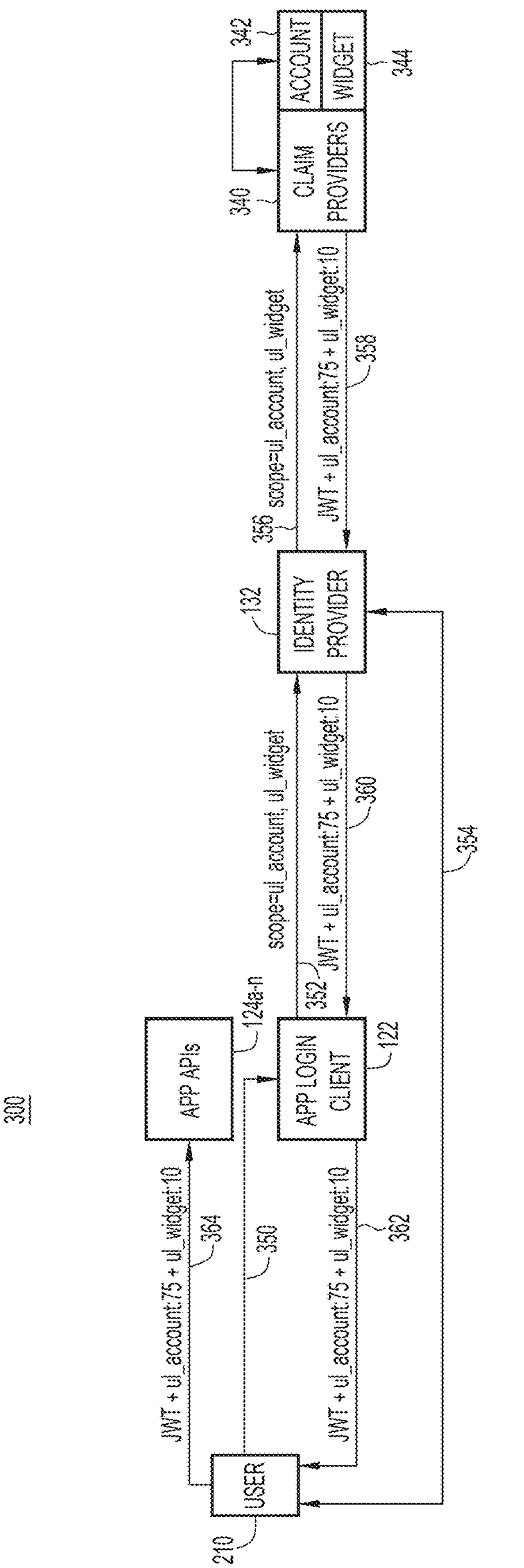
FIG. 3 is a diagram illustrating a system that includes one or more external claim providers that define usage conditions specific to various functions of a web-based service, according to an example embodiment.

With continued reference to FIGS. 1 and 2, FIG. 3 is a diagram illustrating a system 300 that includes one or more external claim providers that define usage conditions specific to various functions of a web-based service, according to an example embodiment. The system 300 includes the user 210 of FIG. 2, the application login client 122 and the App APIs 124*a-n* of FIGS. 1 and 2, the identity provider 132 of FIGS. 1 and 2, and claim providers 340. In the system 300, the identity provider 132 supports external entities that define usage conditions (use limit for various web-based services) i.e., the claim providers 340.

The claim providers 340 specify usage conditions (use limits). Using the claim providers 340, the identity provider 132 may support dynamic use limits. For example, a scope request of ul_account may result in a claim from a usage limit claim provider of "ul_account: 75". The claim providers 340 may define usage conditions for various accounts such as an account 342, and a plurality of actions within a respective account such as a widget 344. That is, the claim providers 340 may include an account use limit claim provider (the account 342) and a widget claim provider (the widget 344). Using the widget 344, the user 210 and/or the web-based service 220 may define use limits for both the account and widget services (or particular functions or features of the service). Allowing the account provider to define the use limit for the account and the widget claim provider to define use limit for widget interactions. Additionally, the identity provider 132 may have rules to resolve any conflicts between use limit e.g., set to lowest use limit.

When leveraging the claim providers 340, zero or more may be utilized. In the system 300, at 350, the user 210 may request access to the web-based service via the application login client 122. The access request may include usage conditions that specify use limits for both the account 342 and the widget 344. At 352, the access request is provided to the identity provider 132 and includes scopes requesting that a use limit is added for the account 342 and a use limit is added for the widget 344. At 354, the identity provider 132 may perform authentication of the user 210 and at 356, the identity provider 132 queries the claim providers 340 for respective count values (use limit for the account 342 and use limit for the widget 344) in response to a successful authentication of the user 210.

At 358, the claim providers 340 provides a count value of 75 for the account 342 and a count value of 10 for the widget 344, for example. The widget 344 may be indicative of interactions that may be performed by the user 210 with respect to the web-based services. For example, the user 210 may be allowed 75 accesses to their banking account using the access token but only 10 withdrawals such that widget interactions are withdrawal of funds from the account. As another example, the user 210 may access their social media account 75 times using the access token (read/write actions) but only 10 posts may be made (write actions are limited to 10). As such, the widget interactions are writing operations or posts to the social media account of the user 210.

The identity provider 132 generates an access token in which usage conditions include two scopes of use. Each scope of use has a corresponding count value indicative of the number of times the access token is to be used for a respective scope of use of the web-based service, e.g., 75 accesses to the account are permitted but only 10 widget actions are allowed for the account. The generated JWT may include "ul_account: 75+ul_widget: 10" usage conditions. At 360, the JWT with these two scopes of uses, is provided to the application login client 122, which forwards it to the user 210, at 362.

The user 210 uses the JWT with scopes defined by the claim providers 340 for making calls to the App APIs 124*a-n* of the web-based service. In particular, at 364, the user 210 may use the JWT with these two scopes (ul_account: 75+ul_widget: 10) to make calls to the App APIs 124*a-n* of the web-based service.

In the system 300, the client (the user 210 using the UE 110) may include a use limit for both the account and widget services. The claim providers 340 allow for the use limit account provider to define the use limit for the account and for the widget claim provider to define the use limit for widget interactions. Regardless of how the identity provider 132 arrives at use limits, they are all encoded into the resulting token(s) that can be used by the web application or the web-based service. While only two scopes of uses are described, this is just an example and number and types of scopes of uses may vary based on a particular deployment and use case scenario.

Figure 4:
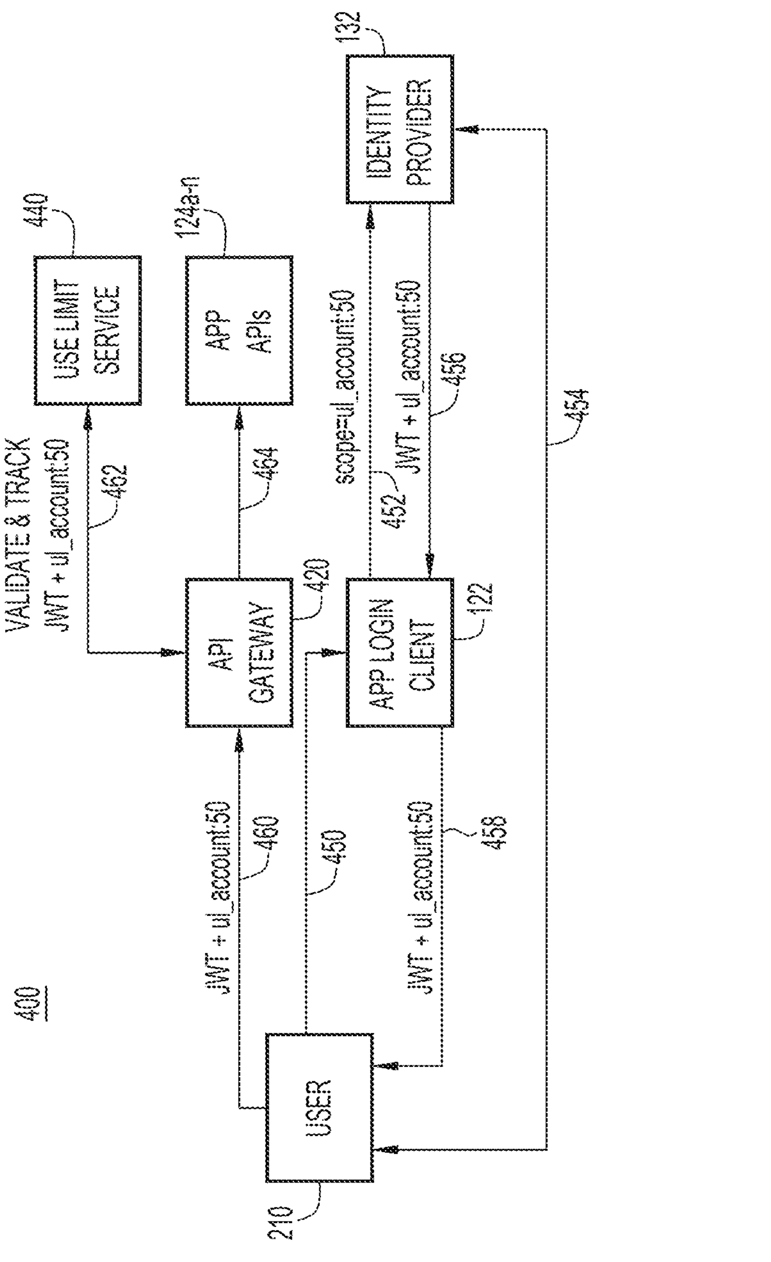
FIG. 4 is a diagram illustrating a system that includes a usage limit service that tracks use of access tokens to ensure that client defined usage conditions for the web-based service are satisfied, according to an example embodiment.

To invalidate the access token prior to the expiration of its time-to-live value (provider set time expiration), the use of the access token may be tracked e.g., by decrementing the count value, an example of which is described in FIG. 4.

With continued reference to FIGS. 1-3, FIG. 4 is a diagram illustrating a system 400 that includes a use limit service that tracks use of access tokens to ensure that client defined usage conditions for the web-based service are satisfied, according to an example embodiment. The system 400 includes the user 210 of FIG. 2 that may be using the UE 110 of FIG. 1 (not shown). The system 400 further includes the application login client 122 of FIGS. 1-3, an API gateway 420 that is connected to the App APIs 124*a-n* of FIGS. 1-3 and a use limit service 440. The system 400 further includes the identity provider 132 of FIGS. 1-3.

API Gateways may be used within web-based applications to route calls to backend services e.g., the App APIs 124*a-n* and to provide rate limiting. In the system 400, use limit capabilities in addition to time-based rate limiting are being provided within the API gateway 420. To facilitate a separation of concerns, the use limit tracking and enforcement are separated into a separate entity that may be external to the web-based service i.e., the use limit service 440. The use limit service 440 is leveraged to track and validate requests through the API gateway 420.

In the system 400, the user 210 sends an access request to the application login client 122 and obtains a JWT token with a use limit e.g., ul-account: 50. The operations 450, 452, 454, 456, and 458 are analogous to operations 250, 252, 254, 256, and 258 of FIG. 2, respectively. As such, detailed description of operations 450-458 is omitted for the sake of brevity.

At 460, the user 210 provides the JWT with the use limit e.g., a count value 50 to the API gateway 420. The API gateway 420 communicates with the use limit service 440 to validate the JWT usage conditions i.e., to determine whether use limit was reached. At 462, the API gateway 420 provides the JWT that has the use limit to the use limit service 440 for validation.

The use limit service 440 is configured to determine whether the JWT is still valid. For example, if the use limit service 440 determines that the JWT is still valid (count value is greater than 0 and the time-to-live value has not yet expired), the use limit service 440 sends a response to the API gateway 420 in which the use limit service 440 indicates that the JWT is valid. The use limit service 440 may then decrement the count value of the JWT e.g., to 49. At 464, the API gateway 420 uses the JWT to make a call to the App APIs 124*a-n*.

On the other hand, if the use limit service 440 determines that the use limit has been reached or is exceeded and/or that the time-to-live value is expired, the use limit service 440 informs the API gateway 420 that the JWT is invalid and the API gateway 420 may return an error message to the user 210. In other words, access to the web-based service (calls to the App APIs 124*a-n*) is denied in response to exceeding the use limit determined based on the count value by the use limit service 440.

While in the system 400 only one use limit service is provided, the disclosure contemplates multiple endpoint use limits. Use limits are not restricted to a single endpoint. The number of endpoint use limits may depend on a particular deployment and use case scenario.

When more than one use limit is in place, the JWT may represent the restrictions by using a list of tuples where the tuple has the limit and an API endpoint. For example, using the use limit with multiple scopes in the system 300 of FIG. 3, the tuple may include [{50, account}, {10, widget}]. By way of another example, when multiple use limits are in place (i.e. multiple usage conditions), the tuple may include an identifier of the scope and the count value such as read operations: 50, write operations: 5 in 10 minutes, edit operations: 10 in 10 minutes, etc. The API gateway 420 may read the tuple in the JWT and communicate with various use limit endpoints to determine validity of the JWT and/or to track the use of the JWT.

When the JWT is determined to be invalid e.g., accessing the web-based service is denied in response to exceeding the use limit (e.g., count value is 0 determined by a respective endpoint use limit), a new token may be requested. The user 210 may request to refresh the access token, an example of which is described in FIG. 5.

With continued reference to FIGS. 1-4, FIG. 5 is a diagram illustrating a refresh process 500 in which a new access token is generated to replace an expired access token, according to an example embodiment. The refresh process 500 involves the user 210 of FIGS. 2-4, which may be using the UE 110 of FIG. 1 (not shown), the application login client 122 of FIGS. 1-4, the API gateway 420 of FIG. 4, the identity provider 132 of FIGS. 1-4, and a token tracking service 540 that includes a claim provider 542 such as the claim providers 340 of FIG. 3 and a use limit service 544 such as the use limit service 440 of FIG. 4.

When an access token expires due to exceeding the use limit (count value) or due to time constraints (TTL), a refresh token may be used by the user 210 to obtain new access token on the user's behalf. When refreshing an access token with a use limit, the identity provider 132 (or the claim provider 542) may adjust the use limits granted in the new access token based on remaining uses.

By way of an example, business logic dictates that the user 210 is restricted to 10,000 calls per 24 hours. This is provided by way of an example only. Further, while only a single use limit is depicted in the refresh process 500, the disclosure is not limited thereto. Multiple use limits may be adjusted in a similar manner. The number and type of usage conditions may depend on a particular deployment and use case scenario.

The refresh process 500 involves at 550, the user 210 provides the JWT with the use limit of 10,000 to the API gateway 420 to make a call to one or more App APIs (not shown). At 552, the API gateway 420 provides the JWT with the use limit of 10,000 to the token tracking service 540 for validation and tracking. The use limit service 544 of the token tracking service 540 may determine that the time-to-live value of the JWT token expired. As such, at 554, the token tracking service 540 returns to the API gateway 420 a message indicating that the access token has expired and access to the web-based services is denied. At 556, the API gateway 420 informs the user 210 that the token has expired and a new token is needed.

As such, at 558, the user 210 (using the UE 110 of FIG. 1), sends a refresh request to the application login client 122. The refresh request for a new access token may include a refresh token (refresh JWT). At 560, the application login client 122 forwards the refresh request for a new access token (refresh JWT) to the identity provider 132.

The identity provider 132 may request the current use count for the original access token (JWT) e.g., the number of uses of the access token or consumed amount in the past 24 hours. The identity provider 132 then generates or issues a new access token (new JWT) with the remaining use limit. Specifically, at 562, the identity provider 132 learns from the use limit service 544 that the access token was already used 9,750 times i.e., the remaining count value is 250. As such, the identity provider 132 generates a new access token (new JWT) with a use limit of the adjusted count value e.g., 250. At 564, the identity provider 132 provides to the application login client 122, the new JWT with the use limit of "250". At 566, the user 210 obtains the new access token that may be used 250 times i.e., with the adjusted count value.

As another example, a service A only allows the user 210 to make two withdrawals in a 24-hour period. Once the user 210 made two withdrawals, the service will either refuse to issue a new access token or return a token with a zero use count value (i.e., limit has been reached or exceeded). As yet another example, the service A allows 1000 requests in 24 hours. If all these 1000 requests are consumed in thirty minutes, the identity provider 132 and the token tracking service 540 may prohibit the user 210 from obtaining another access token (the new JWT). By limiting the number of uses prior to expiration of the access token, the user 210 may be protected from abuse of their account as well as from clock skews in the time-to-live values between various entities (UEs and servers).

Figure 6:
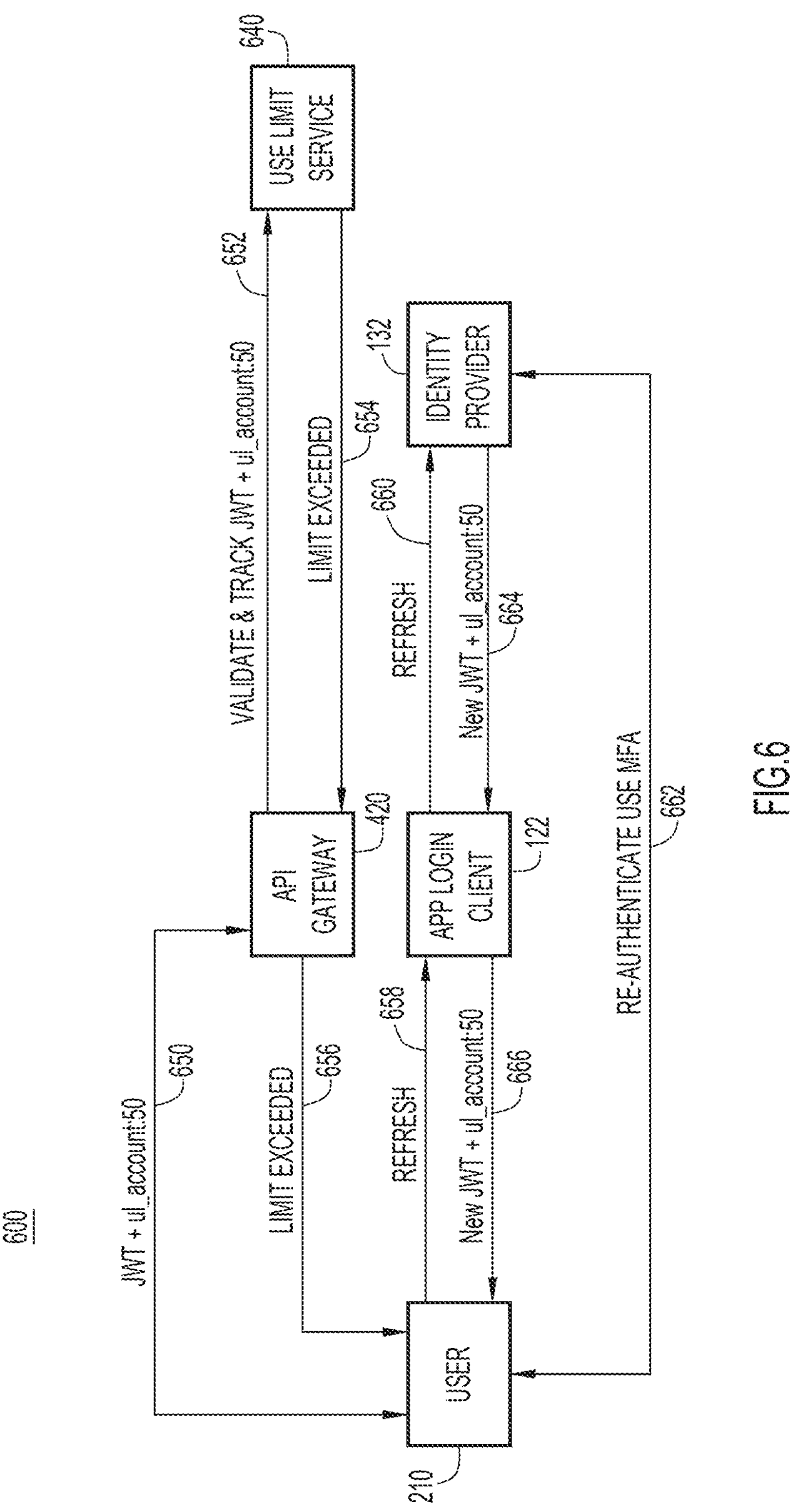
FIG. 6 is a diagram illustrating a reauthentication process, initiated based on a use limit, in which a client is reauthenticated for access to a web-based service, according to an example embodiment.

In one example embodiment, when the number of uses is exceeded while the token is not yet expired (time-to-live value is not 0), additional authentication may be performed, an example of which is described in FIG. 6. In FIG. 6, the additional authentication utilizes multi-factors. In one or more example embodiments, when refreshing a use limit access token (JWT with a use limit) even when use limit has not yet expired, business logic may dictate re-authenticating the user 210 i.e., performing additional authentication.

With continued reference to FIGS. 1-5, FIG. 6 is a diagram illustrating a reauthentication process 600, initiated based on a use limit, in which a client is reauthenticated for access to a web-based service, according to an example embodiment. The reauthentication process 600 involves the user 210 of FIGS. 2-5, which may be using the UE 110 of FIG. 1 (not shown), the application login client 122 of FIGS. 1-5, the API gateway 420 of FIGS. 4 and 5, the identity provider 132 of FIGS. 1-5, and a use limit service 640 such as the token tracking service 540 of FIG. 5 or the use limit service 440 of FIG. 4.

The reauthentication process 600 may be triggered by trying to use an access token in which use limit has been reached (an invalid JWT). In the reauthentication process 600, the operations 650, 652, 654, 656, 658, and 660 are analogous to operations 550, 552, 554, 556, 558, and 560 of FIG. 5, respectively. As such, detailed description of operations 650-660 is omitted for the sake of brevity.

At 662, the identity provider 132 requires reauthentication of the user 210. The reauthentication may be the same as the initial authentication or may be a more secure authentication e.g., an MFA or two authentications, etc. As an example, web-based service may only allow the user 210 to make 2 withdrawals within a four-hour window without re-authenticating. Therefore, once the user 210 has consumed the 2 withdrawals limit, the identity provider 132 forces the user 210 to reauthenticate before issuing a new access token (new JWT). As another example, if the user 210 makes 100 calls (reaches the use limit) within first five minutes, a multi-factor authentication (MFA) or additional more secure authentication may be required to obtain a new access token.

In response to a successful reauthentication of the user 210, at 664, the identity provider 132 provides a new access token with a new use limit e.g., ul_account: 50. At 666, the new access token with the new use limit of 50 calls is provided to the user 210.

The techniques presented herein add usage condition(s) i.e., use limits to access tokens. In one or more example embodiments, by utilizing the OpenID Connect access tokens with JWT scopes and claims, a system may capture use limits in an immutable form. Applications or web-based services leverage a single JWT with scopes and claims to restrict one or more endpoints with use limits. Application clients may utilize OpenID Connect scopes to specify use limits.

The techniques presented herein allow applications to support user specified use limits that may be captured with the OpenID Connect scopes. As such, client usage conditions are captured in access token and within provider-based time limits. In one or more example embodiments, by utilizing the immutable JWT scopes and claims for specifying use limits, API gateways may dynamically configure and enforce execution limits for JWT access tokens.

While one or more example embodiments are described with respect to client and web-based service interactions, the disclosure is not limited thereto. Use limits may also be configured and enforced for machine-to-machine interactions e.g., between two servers, backend applications, etc.

The techniques presented herein may further provide for dynamically adjusting requested use limit scopes and claims based on an age of the initial access. In one or more example embodiments, requested use limits may also be based on the number or frequency of the refresh token requests. For example, first two new refresh access tokens may be issued based on a first time of authentication (e.g., answer security questions), whereas the following new refresh access tokens may be issued based on additional, more secure authentication (e.g., MFA, biometric authentication, etc.). In one or more example embodiments, use limits per user may be fixed over a certain period in which reauthentication is to be performed before issuing a use limit access token.

The techniques presented herein may further involve use limit claim providers, which may be chained together to delegate use limit grants across multiple sources of truth.

The techniques presented herein may protect users against security attacks and other misuses by setting use limits within provider time limits in access tokens. Moreover, the techniques presented herein may allow users to control use limits of the access tokens and adjust based on use scopes and other features and preferences. Usage based JWT expiration extends the use of JWT's capabilities to accommodate special user requests. The techniques presented herein may allow clients and users with control to adjust their own rate limits and authentication levels within the provider-based limits.

Figure 7:
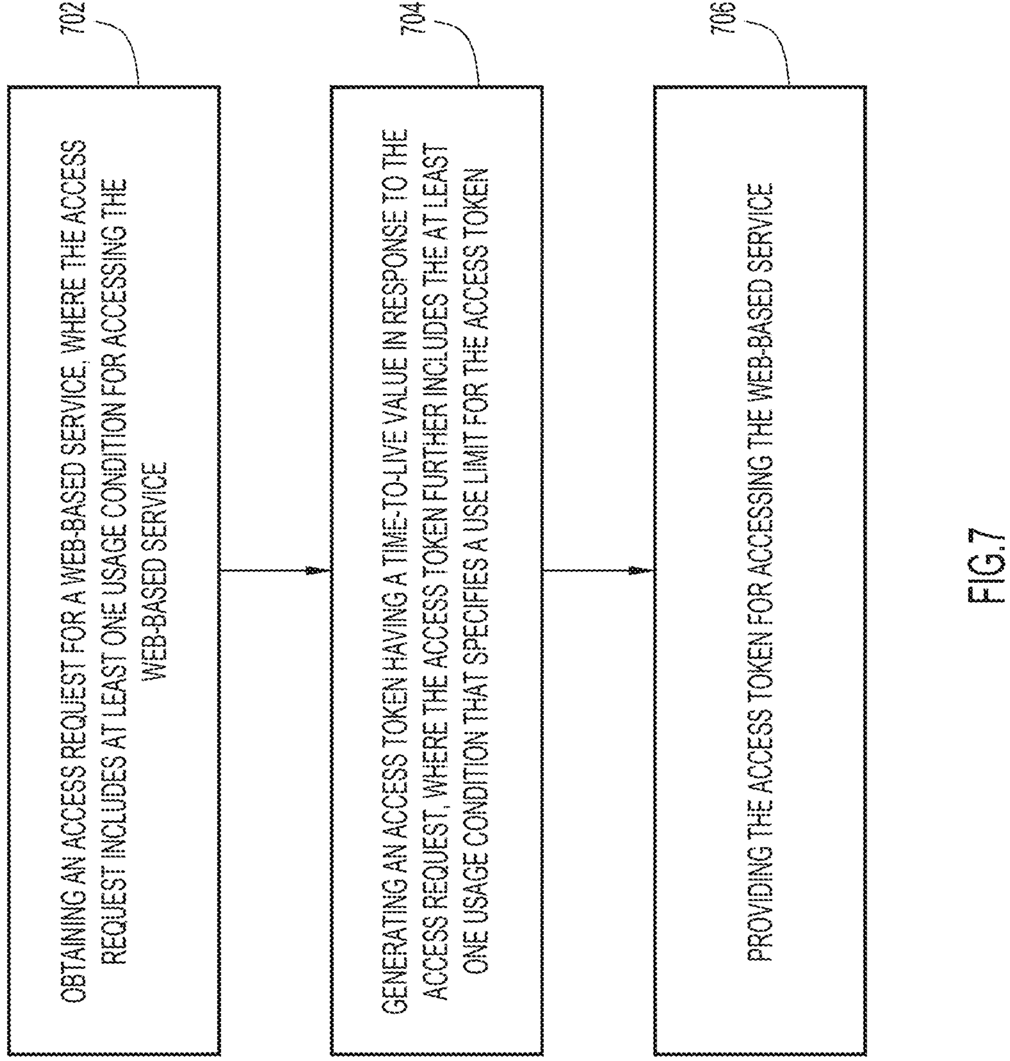
FIG. 7 is a flowchart illustrating a computer-implemented method of providing an access token with a use limit based on at least one usage condition specified in an access request, according to an example embodiment.

FIG. 7 is a flowchart illustrating a computer-implemented method 700 of providing an access token with a use limit based on at least one usage condition specified in an access request, according to an example embodiment. The computer-implemented method 700 may be performed by a computing device of FIG. 8 such as a server, a group of servers, or in a cloud. The computer-implemented method 700 may be performed by the identity provider 132 of FIGS. 1-6 and/or one or more other entities of the systems described in example embodiments above.

The computer-implemented method 700 involves at 702, obtaining an access request for a web-based service. The access request includes at least one usage condition for accessing the web-based service.

The computer-implemented method 700 further involves at 704, generating an access token having a time-to-live value in response to the access request. The access token further includes at least one usage condition that specifies a use limit for the access token.

The computer-implemented method 700 further involves at 706, providing the access token for accessing the web-based service.

In one form, at least one usage condition may include a count value indicative of a number of times the access token is to be used to access the web-based service.

In another form, the computer-implemented method 700 may further involve tracking use of the access token by decrementing the count value. In the computer-implemented method 700, accessing the web-based service may be permitted while the count value and the time-to-live value are valid. In the computer-implemented method 700, accessing the web-based service may be denied in response to exceeding the use limit determined based on the count value.

In yet another form, the computer-implemented method 700 may further involve obtaining a refresh request for a new access token and generating the new access token in which the count value is set to a remaining use limit based on tracking use of the access token.

In one instance, the computer-implemented method 700 may further involve authenticating a user for accessing the web-based service based on the access request. The operation 704 of generating the access token may be based on a successful authentication of the user.

In another instance, the computer-implemented method 700 may further involve obtaining a refresh request for a new access token and performing an additional multi-factor authentication of the user for the new access token based on the count value.

According to one or more example embodiments, at least one usage condition may be specified by a user or may be specified by a provider of the web-based service.

According to one or more example embodiments, at least one usage condition may include at least two scopes of use. Each scope of use may have a corresponding count value indicative of a number of times the access token is to be used for a respective scope of use of the web-based service.

In one instance, the access token may be a JavaScript Object Notation (JSON) web token.

Figure 5:
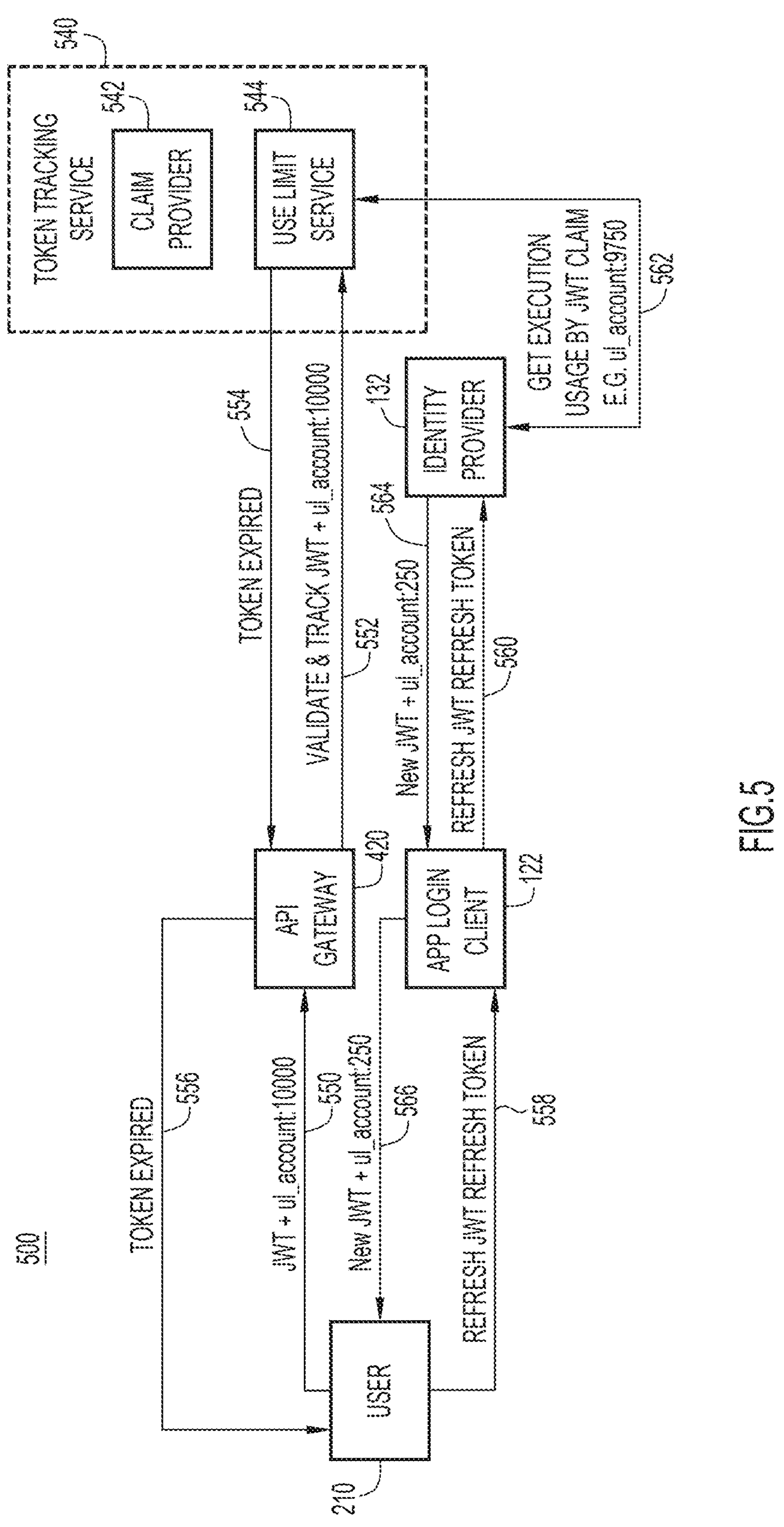
FIG. 5 is a diagram illustrating a refresh process in which a new access token is generated to replace an expired access token, according to an example embodiment.
Figure 8:
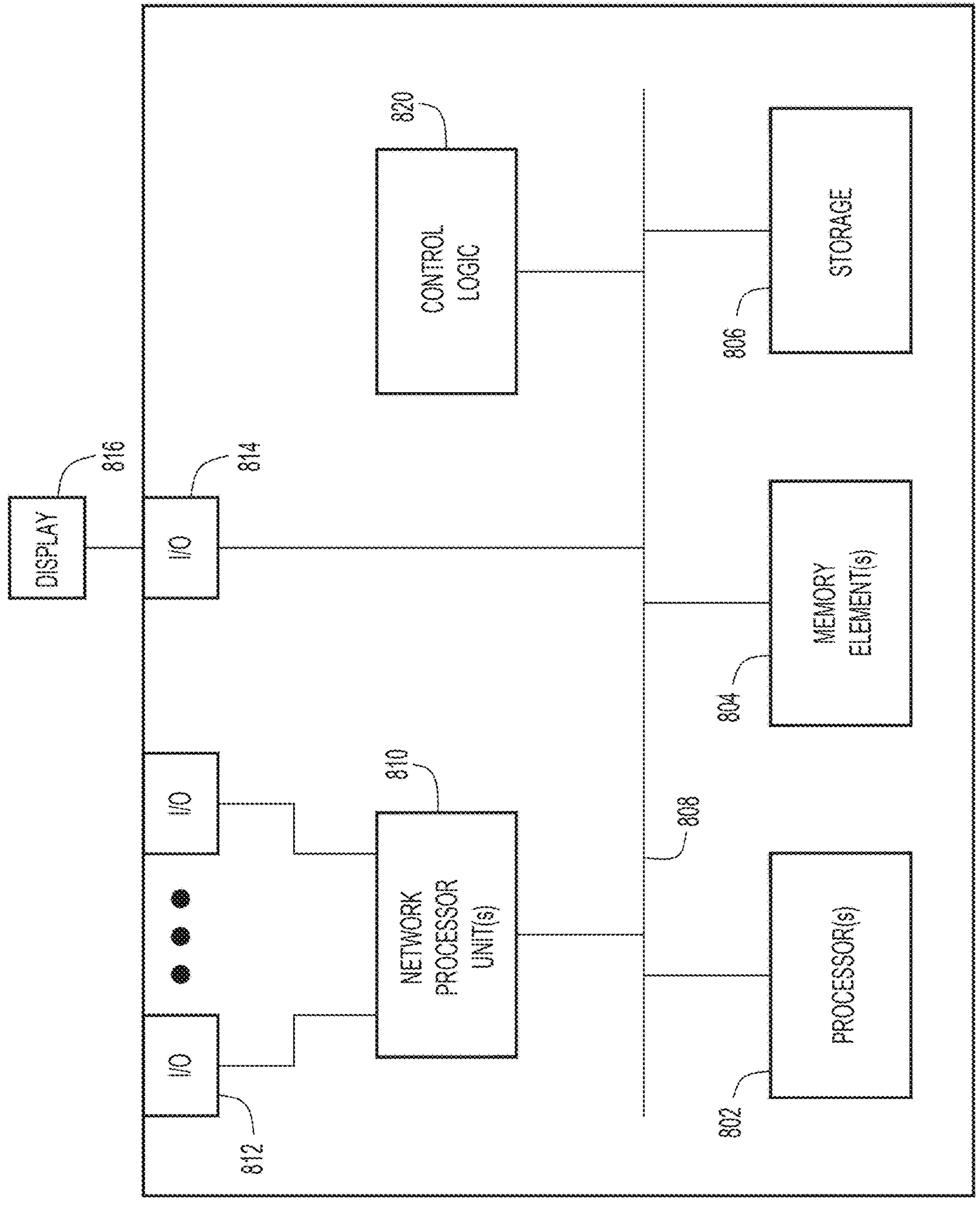
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the computing device or one or more servers that execute one or more entities of the system 100 of FIG. 1 (e.g., the UE 110, the app/web server(s) 120, the authentication server(s) 130, and/or the identity provider 132), the web-based service 220 of FIG. 2, one or more entities of the system 300 of FIG. 3 (e.g., the claim providers 340), one or more entities of the system 400 of FIG. 4 (e.g., the API gateway 420 and/or the use limit service 440), the token tracking service 540 of FIG. 5, and/or use limit service 640 of FIG. 6. Further, the computing device 800 may be representative of an apparatus such as one of the network devices, network/computing equipment, hardware asset, a user equipment or user device. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various example embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various example embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 816 such as a computer monitor, a display screen, or the like.

In various example embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor of the apparatus is configured to perform a method including obtaining an access request for a web-based service. The access request includes at least one usage condition for accessing the web-based service. The method further includes generating an access token having a time-to-live value in response to the access request. The access token further includes at least one usage condition that specifies a use limit for the access token. The method further includes providing the access token for accessing the web-based service.

In yet another example embodiment, one or more non-transitory computer readable storage media encoded with instructions are provided. When the media is executed by a processor, the instructions cause the processor to execute a method that involves obtaining an access request for a web-based service. The access request includes at least one usage condition for accessing the web-based service. The method further involves generating an access token having a time-to-live value in response to the access request. The access token further includes at least one usage condition that specifies a use limit for the access token. The method further involves providing the access token for accessing the web-based service.

In yet another example embodiment, a system is provided that includes the devices or apparatuses and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm. wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)'nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining, by an identity provider, an access request for a web-based service, wherein the access request includes at least one usage condition for accessing the web-based service;

generating, by the identity provider, an access token having a time-to-live value in response to the access request, wherein the access token further includes the at least one usage condition that specifies a use limit for the access token; and providing the access token for accessing the web-based service.

2. The computer-implemented method of claim 1, wherein the at least one usage condition includes a count value indicative of a number of times the access token is to be used to access the web-based service.

3. The computer-implemented method of claim 2, further comprising:

tracking use of the access token by decrementing the count value, wherein accessing the web-based service is permitted while the count value and the time-to-live value are valid, and wherein accessing the web-based service is denied in response to exceeding the use limit determined based on the count value.

4. The computer-implemented method of claim 3, further comprising:

obtaining a refresh request for a new access token; and generating the new access token in which the count value is set to a remaining use limit based on tracking use of the access token.

5. The computer-implemented method of claim 2, further comprising:

authenticating a user for accessing the web-based service based on the access request, wherein generating the access token is based on a successful authentication of the user.

6. The computer-implemented method of claim 5, further comprising:

obtaining a refresh request for a new access token; and performing an additional multi-factor authentication of the user for the new access token based on the count value.

7. The computer-implemented method of claim 1, wherein the at least one usage condition is specified by a user or is specified by a provider of the web-based service.

8. The computer-implemented method of claim 1, wherein the at least one usage condition includes at least two scopes of use, each scope of use having a corresponding count value indicative of a number of times the access token is to be used for a respective scope of use of the web-based service.

9. The computer-implemented method of claim 1, wherein the access token is a JavaScript Object Notation (JSON) web token.

10. An apparatus comprising:

a memory;

a network interface configured to enable network communications; and a processor, wherein the processor is configured to perform a method comprising:

obtaining an access request for a web-based service, wherein the access request includes at least one usage condition for accessing the web-based service;

generating an access token having a time-to-live value in response to the access request, wherein the access token further includes the at least one usage condition that specifies a use limit for the access token; and providing the access token for accessing the web-based service.

11. The apparatus of claim 10, wherein the at least one usage condition includes a count value indicative of a number of times the access token is to be used to access the web-based service.

12. The apparatus of claim 11, wherein the processor is further configured to perform:

tracking use of the access token by decrementing the count value, wherein accessing the web-based service is permitted while the count value and the time-to-live value are valid, and wherein accessing the web-based service is denied in response to exceeding the use limit determined based on the count value.

13. The apparatus of claim 12, wherein the processor is further configured to perform:

obtaining a refresh request for a new access token; and generating the new access token in which the count value is set to a remaining use limit based on tracking use of the access token.

14. The apparatus of claim 11, wherein the processor is further configured to perform:

authenticating a user for accessing the web-based service based on the access request, wherein generating the access token is based on a successful authentication of the user.

15. The apparatus of claim 14, wherein the processor is further configured to perform:

obtaining a refresh request for a new access token; and performing an additional multi-factor authentication of the user for the new access token based on the count value.

16. The apparatus of claim 10, wherein the at least one usage condition is a user configured feature or is specified by a provider of the web-based service.

17. One or more non-transitory computer readable storage media encoded with software comprising computer executable instructions that, when executed by a processor, cause the processor to perform a method including:

obtaining an access request for a web-based service, wherein the access request includes at least one usage condition for accessing the web-based service;

generating an access token having a time-to-live value in response to the access request, wherein the access token further includes the at least one usage condition that specifies a use limit for the access token; and providing the access token for accessing the web-based service.

18. The one or more non-transitory computer readable storage media according to claim 17, wherein the at least one usage condition includes a count value indicative of a number of times the access token is to be used to access the web-based service.

19. The one or more non-transitory computer readable storage media according to claim 18, wherein the computer executable instructions cause the processor to perform:

tracking use of the access token by decrementing the count value, wherein accessing the web-based service is permitted while the count value and the time-to-live value are valid, and wherein accessing the web-based service is denied in response to exceeding the use limit determined based on the count value.

20. The one or more non-transitory computer readable storage media according to claim 19, wherein the computer executable instructions cause the processor to perform:

obtaining a refresh request for a new access token; and generating the new access token in which the count value is set to a remaining use limit based on tracking use of the access token.

* * * * *